United States Patent
Hasegawa

(10) Patent No.: US 10,177,361 B2
(45) Date of Patent: Jan. 8, 2019

(54) COATING FLUID, LAMINATED POROUS FILM, AND NON-AQUEOUS ELECTROLYTE SECONDARY BATTERY

(71) Applicant: SUMITOMO CHEMICAL COMPANY, LIMITED, Tokyo (JP)

(72) Inventor: Hirohiko Hasegawa, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 854 days.

(21) Appl. No.: 14/406,804

(22) PCT Filed: Jun. 17, 2013

(86) PCT No.: PCT/JP2013/067153
§ 371 (c)(1),
(2) Date: Dec. 10, 2014

(87) PCT Pub. No.: WO2013/191290
PCT Pub. Date: Dec. 27, 2013

(65) Prior Publication Data
US 2015/0140439 A1 May 21, 2015

(30) Foreign Application Priority Data
Jun. 20, 2012 (JP) .................... 2012-138354

(51) Int. Cl.
*H01M 2/16* (2006.01)
*C09D 7/65* (2018.01)
*H01M 2/14* (2006.01)
*C09D 129/04* (2006.01)

(52) U.S. Cl.
CPC .............. *H01M 2/166* (2013.01); *C09D 7/65* (2018.01); *C09D 129/04* (2013.01); *H01M 2/145* (2013.01); *H01M 2/1686* (2013.01)

(58) Field of Classification Search
CPC .... H01M 2/166; H01M 2/145; H01M 2/1686; H01M 2/14; H01M 2/16; C09D 7/125; C09D 129/04
USPC ........................................................ 429/254
See application file for complete search history.

(56) References Cited

U.S. PATENT DOCUMENTS

| | | | |
|---|---|---|---|
| 2004/0229116 A1* | 11/2004 | Malinski | H01M 2/145 429/144 |
| 2009/0226576 A1 | 9/2009 | Kanehara et al. | |
| 2010/0190063 A1 | 7/2010 | Fukumoto et al. | |
| 2010/0285348 A1* | 11/2010 | Murata | B32B 27/20 429/144 |
| 2011/0123850 A1 | 5/2011 | Duong et al. | |
| 2011/0143183 A1* | 6/2011 | Matsumoto | H01M 2/1626 429/144 |
| 2012/0189896 A1 | 7/2012 | Zhou et al. | |
| 2012/0251868 A1 | 10/2012 | Shinohara et al. | |
| 2014/0107275 A1* | 4/2014 | Uemura | H01M 2/1653 524/503 |
| 2014/0329154 A1 | 11/2014 | Shinoda et al. | |

FOREIGN PATENT DOCUMENTS

| | | | | |
|---|---|---|---|---|
| CN | 1544252 A | | 11/2004 | |
| JP | 4-68028 A | | 3/1992 | |
| JP | 2004-227972 A | | 8/2004 | |
| JP | 2007003680 A | * | 1/2007 | |
| JP | 2008-186721 A | | 8/2008 | |
| JP | 2011-103277 A | | 5/2011 | |
| JP | 2012-054229 A | | 3/2012 | |
| JP | 2012-069457 A | | 4/2012 | |
| JP | WO 2012165578 A1 | * | 12/2012 | ............ H01M 4/628 |
| JP | 2013-64116 A | | 4/2013 | |
| WO | 2010/142851 A1 | | 12/2010 | |

OTHER PUBLICATIONS

English translation of JP 2007003680 A, Iwakama, Jan. 2007, Japan.*

* cited by examiner

*Primary Examiner* — Jonathan G Jelsma
*Assistant Examiner* — Rashid A Alam
(74) *Attorney, Agent, or Firm* — Sughrue Mion, PLLC

(57) ABSTRACT

A coating liquid according to the present invention comprises polyvinyl alcohol (PVA), boric acid and/or an organometallic compound having the ability of cross-linking PVA, an inorganic filler, a water-soluble compound having a carboxyl group and/or a sulfonic group, and water. According to the present invention, a coating liquid can be obtained which is useful in the preparation of a laminated porous film having suppressed powder fall-off and excellent heat shape stability.

10 Claims, No Drawings

COATING FLUID, LAMINATED POROUS FILM, AND NON-AQUEOUS ELECTROLYTE SECONDARY BATTERY

CROSS REFERENCE TO RELATED APPLICATIONS

This application is a National Stage of International Application No. PCT/JP2013/067153 filed Jun. 17, 2013, claiming priority based on Japanese Patent Application No. 2012-138354 filed Jun. 20, 2012, the contents of all of which are incorporated herein by reference in their entirety.

TECHNICAL FIELD

The present invention relates to a coating liquid which is used for production of a laminated porous film suitable for a separator for a non-aqueous electrolyte secondary battery, a laminated porous film produced by using the coating liquid, and a non-aqueous electrolyte secondary battery using the laminated porous film as a separator.

BACKGROUND ART

Anon-aqueous electrolyte secondary battery, particularly a lithium secondary battery, has a high energy density, and therefore it is widely used as a battery to be used for personal computers, mobile phones, portable information terminals, etc.

The non-aqueous electrolyte secondary battery typified by these lithium secondary batteries has a high energy density, and high electric current flows in the battery to excessively generate heat when an internal short circuit or an external short circuit occurs due to the failure of the battery or to the failure of equipment using the battery. Thus, it has been required to prevent heat generation equal to or above a certain level and ensure high safety in the non-aqueous electrolyte secondary battery.

As means for ensuring the safety, a method of imparting a shutdown function, which blocks ion passage between positive electrode and negative electrode through a separator to prevent further heat generation at the time of abnormal heat generation, is common. An example of the method of imparting a shutdown function to a separator includes a method of using a porous film made of a material which melts at the time of abnormal heat generation as a separator. That is, in a battery using the separator, the porous film melts and becomes nonporous at the time of abnormal heat generation, and therefore ion passage can be blocked to suppress further heat generation.

As the separator having such a shutdown function, for example, a porous film made of polyolefin is used. A separator comprising the porous film made of polyolefin melts and becomes nonporous at about 80 to 180° C. at the time of abnormal heat generation of a battery, and thereby, ion passage can be blocked (shut down) to suppress further heat generation. However, for example, when the heat generation is excessive, the separator comprising the porous film may cause a short circuit due to direct contact between positive electrode and negative electrode by shrinkage or breakage of the film. Thus, the separator comprising the porous film made of polyolefin has insufficient shape stability and may not suppress abnormal heat generation due to short circuit.

As means for ensuring safety in abnormal heat generation of a battery, there is proposed a separator for a non-aqueous electrolyte secondary battery comprising a laminated porous film which is formed by using carboxymethyl cellulose (hereinafter, may be referred to as "CMC") or polyvinyl alcohol (hereinafter, may be referred to as "PVA") as a binder resin, joining inorganic fillers to one another with the binder resin to form a heat-resistant layer composed of a porous layer, and laminating the heat-resistant layer and a porous film (hereinafter, may be referred to as a "substrate material porous film") predominantly composed of polyolefin as a substrate material (e.g., see Patent Documents 1 and 2).

PRIOR ART DOCUMENT

Patent Documents

Patent Document 1: JP-A-2004-227972
Patent Document 2: JP-A-2008-186721

DISCLOSURE OF THE INVENTION

However, the laminated porous film in which CMC is used as a binder resin has excellent heat shape stability, but has a problem of suppressing a fall of the filler from the heat-resistant layer at the surface of the laminated porous film, a so-called "powder fall-off", and the laminated porous film having a heat-resistant layer in which PVA is used as a binder resin is excellent in suppressing of powder fall-off, but has a problem in heat shape stability.

It is an object of the present invention to provide a coating liquid which is useful in the preparation of a laminated porous film having suppressed powder fall-off and excellent heat shape stability, a laminated porous film having a heat-resistant layer formed from the coating liquid, and a non-aqueous electrolyte secondary battery which uses the laminated porous film as a separator.

In order to solve the above problems, the present inventor has made earnest investigations, and consequently has completed the present invention.

That is, the present invention includes the following aspects.

<1> A coating liquid comprising polyvinyl alcohol (PVA), boric acid and/or an organometallic compound having the ability of cross-linking PVA, an inorganic filler, a water-soluble compound having a carboxyl group and/or a sulfonic group, and water.

<2> The coating liquid according to <1>, wherein the organometallic compound having the ability of cross-linking PVA is an organic titanium compound having the ability of cross-linking PVA.

<3> The coating liquid according to <2>, wherein the organic titanium compound is titanium lactate.

<4> The coating liquid according to any one of <1> to <3>, wherein the water-soluble compound is a polymer compound.

<5> The coating liquid according to any one of <1> to <4>, wherein the water-soluble compound is one or more compounds selected from the group consisting of carboxymethyl cellulose, polyacrylic acid and salts thereof.

<6> The coating liquid according to any one of <1> to <5>, wherein the coating liquid comprises boric acid and/or an organometallic compound having the ability of cross-linking PVA in an amount of 10 parts by weight or more and 40 parts by weight or less with respect to 100 parts by weight of polyvinyl alcohol.

<7> The coating liquid according to any one of <1> to <6>, wherein the inorganic filler is alumina.

<8> The coating liquid according to any one of <1> to <7>, wherein the coating liquid comprises the water-soluble compound in an amount of 0.2 parts by weight or more and 2 parts by weight or less with respect to 100 parts by weight of the inorganic filler.

<9> The coating liquid according to any one of <1> to <8>, wherein a total amount of polyvinyl alcohol and the water-soluble compound is 2 parts by weight or more and 8 parts by weight or less with respect to 100 parts by weight of the inorganic filler.

<10> A laminated porous film having a heat-resistant layer formed by applying the coating liquid according to any one of <1> to <9> onto one side or both sides of a substrate material porous film and removing a medium.

<11> A non-aqueous electrolyte secondary battery using the laminated porous film according to <10> as a separator.

The present invention efficiently and stably provides a laminated porous film having suppressed powder fall-off and excellent heat shape stability, that is, a laminated porous film which is formed by laminating a heat-resistant layer containing PVA as a binder resin and an inorganic filler on a substrate material porous film. The laminated porous film is suitable for a separator for a non-aqueous electrolyte secondary battery.

<Coating Liquid>

The coating liquid of the present invention comprises PVA as a binder resin, boric acid and/or an organometallic compound having the ability of cross-linking PVA, an inorganic filler, a water-soluble compound having a carboxylic group and/or a sulfonic group, and water.

The coating liquid of the present invention is used for the formation of a B layer in a laminated porous film which is formed by laminating a substrate material porous film (hereinafter, may be referred to as an "A layer") and a heat-resistant layer (hereinafter, may be referred to as a "B layer") containing an inorganic filler and a binder resin.

Hereinafter, the constituent components of the coating liquid of the present invention will be described in detail.

<Polyvinyl Alcohol (PVA)>

In the coating liquid of the present invention, PVA has a function as a binder resin of the inorganic filler PVA having a higher degree of saponification is preferred; however, partially unsaponified PVA is less likely to cause foaming than fully saponified PVA in stirring for the preparation of the coating liquid, and therefore the degree of saponification is preferably 75 to 95%, and more preferably 80 to 90%. The degree of polymerization of PVA is preferably 200 or more from the viewpoint of the ability to be bound to the inorganic filler, and preferably 5000 or less from the viewpoint of good dissolution in water.

Further, the coating liquid may contain a small amount of another binder resin as required to such an extent that the object of the present invention is not impaired.

<Compound Having Ability of Cross-Linking PVA>

In the coating liquid of the present invention, boric acid and the organometallic compound having the ability of cross-linking PVA are compounds having a cross-linking property for PVA which is a binder resin. The compounds have an action of cross-linking PVA in a step of applying the coating liquid onto the A layer and removing the medium to form the B layer or a step of heat treatment after forming the B layer, etc., and imparts high heat shape retainability to the laminated porous film of the present invention.

Herein, the PVA cross-linking compound in the present invention needs to be a compound which exists stably in the coating liquid. That is, crosslinking of PVA does not occur significantly in the coating liquid, and the viscosity of the coating liquid does not excessively increase.

As such a PVA cross-linking compound, a PVA cross-linking compound having solubility in water, which is a solvent of the coating liquid of the present invention, may be used, and examples of the compound include boric acid for an inorganic acid; and water-soluble titanium organic compounds such as titanium lactate, water-soluble zirconium organic compounds, water-soluble aluminum organic compounds and water-soluble silicon organic compounds for the organometallic compound. One of these compounds may be used, or a mixture of two or more of these compounds may be used as required. Further, a mixture of boric acid and the organometallic compound having the ability of cross-linking PVA may be used.

In the coating liquid of the present invention, the amount of the compound having the ability of cross-linking PVA to be added may be an amount not reducing the elastic modulus of PVA as a binder resin at a temperature of 100 to 200° C., and the amount is preferably 10 to 40 parts by weight, and more preferably 15 to 30 parts by weight with respect to 100 parts by weight of PVA. The above-mentioned amount to be added is the total parts by weight of all compounds having the ability of cross-linking PVA when two or more kinds of the compounds having the ability of cross-linking PVA are added.

The elastic modulus of the cross-linked PVA in the temperature range described above can be determined by preparing a film composed of PVA alone separately and measuring the dynamic viscoelasticity thereof.

<Water-Soluble Compound Having Carboxylic Group and/or Sulfonic Group>

The coating liquid of the present invention comprises a water-soluble compound (hereinafter, may be collectively simply referred to as a "water-soluble compound") having a carboxylic group and/or a sulfonic group. The water-soluble compound is preferably a polymer compound.

Examples of the water-soluble compound containing a carboxylic group include polymers of monocarboxylic acids such as acrylic acid, methacrylic acid and crotonic acid; monocarboxylic acid derivatives such as 2-ethylacrylic acid, 2-ethylacrylic acid, isocrotonic acid, α-acetoxyacrylic acid, β-trans-aryloxyacrylic acid, α-chloro-β-E-methoxyacrylic acid, and β-diaminoacrylic acid; dicarboxylic acids such as maleic acid, fumaric acid and itaconic acid; acid anhydrides of dicarboxylic acids such as maleic anhydride, acrylic anhydride, methylmaleic anhydride and dimethylmaleic anhydride; and dicarboxylic acid derivatives such as methylmaleic acid, dimethylmaleic acid, phenylmaleic acid, chloromaleic acid, dichloromaleic acid, fluoromaleic acid, maleic acid methylallyl, diphenyl maleate, nonyl maleate, decyl maleate, dodecyl maleate, octadecyl maleate and fluoroalkyl maleate. The polymer may contain another compound to such an extent that water-solubility is not impaired. Additionally, examples of the water-soluble compound containing a carboxylic group include polysaccharide polymers such as alginic acid and CMC.

Examples of the water-soluble compound containing a sulfonic group include polymers of vinyl sulfonic acid, methylvinyl sulfonic acid, (meth)allyl sulfonic acid, styrene sulfonic acid, 2-sulfonate-ethyl(meth)acrylate, 2-acrylamide-2-methylpropane sulfonic acid and 3-allyloxy-2-hydroxypropane sulfonic acid. The polymer may contain another compound to such an extent that water-solubility is not impaired.

These water-soluble compounds usually exist as a salt, and a counter-cation of the carboxylic group or the sulfonic group is not particularly limited as long as it is dispersed well in the coating liquid, and examples thereof include an oxonium ion, an alkali metal ion and an ammonium ion.

These water-soluble compounds and salts thereof may be used singly, or as a mixture of two or more thereof.

Among these, carboxymethyl cellulose, polyacrylic acid and salts thereof are preferred in that since these compounds can also function as a thickener and impart moderate viscosity to the coating liquid, the compounds enable to prepare a coating liquid having excellent stability for time-dependent change.

The amount of the water-soluble compound may be an amount by which a good heat-resistant layer can be obtained, and the amount, depending on the kind of the water-soluble compound or the material and specific surface area of the inorganic filler, is preferably 0.2 to 2 parts by weight with respect to 100 parts by weight of the inorganic filler. The above-mentioned amount is the total parts by weight of all water-soluble compounds when two or more kinds of the water-soluble compounds are added.

In the coating liquid and accordingly the B layer formed from the coating liquid in the present invention, the total amount of PVA and the water-soluble compound is preferably 2 to 8 parts by weight with respect to 100 parts by weight of the inorganic filler to be used. When the total amount is more than 8 parts by weight, there is a possibility that the ion permeability of the B layer may be insufficient, and when the total amount is less than 2 parts by weight, the amount of powder fall-off tends to increase.

<Inorganic Filler>

In the coating liquid of the present invention, as the inorganic filler, an inorganic filler commonly referred to as a filler can be used. Specific examples of the inorganic filler include fillers made of inorganic materials such as calcium carbonate, talc, clay, kaolin, silica, hydrotalcite, diatom earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite and glass. These fillers can be used singly, or as a mixture of two or more thereof.

Among these, inorganic oxides are preferred as the inorganic filler, and alumina is more preferred from the viewpoint of heat resistance and chemical stability.

Many crystal forms such as α-alumina, β-alumina, γ-alumina, and θ-alumina exist in alumina, and any crystal form can be suitably used. Among these, α-alumina is preferred in point of high thermal stability and chemical stability.

These filler materials can be used singly. These filler materials can also be used as a mixture of two or more thereof.

The inorganic filler can take various forms such as a spherical shape, an oval shape, a rectangular shape or an indefinite shape not having a specific shape according to a production method for an inorganic filler material or a dispersing condition in preparing the coating liquid, and any thereof can be used.

The content of the inorganic filler is preferably 60% by volume or more, and more preferably 70% by volume or more when the whole solid content in the coating liquid is taken as 100% by volume so that the voids formed by contact between the inorganic fillers are less closed with another constituent material such as a binder resin and the ion permeability is maintained high in forming the heat-resistant layer (B layer) from the coating liquid of the present invention.

<Solvent>

As a solvent in the coating liquid of the present invention, water is an essential component. As such a solvent, only water may be used; however, a solvent predominantly composed of water is suitable. The phrase "solvent predominantly composed of water" as used herein means a solvent containing water in an amount of 50% by volume or more. By using the solvent predominantly composed of water, PVA having a water-soluble property, boric acid and/or the organometallic compound having the ability of cross-linking PVA and the above-mentioned water-soluble compound can be uniformly dissolved, and the inorganic filler can be dispersed well.

A mixture of water and an organic polar solvent is more preferred in that particularly after laminating the B layer on the A layer, the rate of drying and removing the used solvent can be accelerated.

As the organic polar solvent to be used for the mixed solvent, alcohols which are compatible with water at an arbitrary ratio and have moderate polarity are suitable, and among the alcohols, methanol, ethanol and isopropyl alcohol are preferred. A ratio between water and the organic polar solvent is selected in consideration of coatability, levelling property and kind of a binder resin to be used, and the mixed solvent usually contains water in an amount of 50% by weight or more, and preferably 70% by weight or more.

Further, the coating liquid may contain components other than the inorganic filler and the binder resin as required within a range which does not impair the object of the present invention. Examples of such a component include a plasticizer and a pH adjuster.

<Production Method for Coating Liquid>

A method of dispersing and mixing the above-mentioned inorganic filler to prepare a coating liquid is not particularly limited as long as it is a method required for obtaining a homogeneous coating liquid. Examples thereof include a mechanical stirring method, an ultrasonic dispersion method, a high-pressure dispersion method, and a media dispersion method, and among these, a high-pressure dispersion method is preferred in that the inorganic filler can be highly dispersed, and the inorganic filler can be blended into the water-soluble compound in a short time.

A mixing order is not limited as long as particular obstruction such as the occurrence of precipitate in the coating liquid does not occur; however, a method of adding another component to an aqueous solution containing PVA and the water-soluble compound is usually employed. Particularly, when the coating liquid is produced on an industrial scale, in order to prevent obstruction such as settling or reaggregation of the inorganic filler, it is preferred that an aqueous solution containing PVA and the water-soluble compound is prepared, and the inorganic filler, boric acid and/or the organometallic compound having the ability of cross-linking PVA are added to the aqueous solution in this order while stirring the aqueous solution, and then the coating liquid is dispersed and mixed.

Hereinafter, the substrate material porous film (A layer) and the heat-resistant layer (B layer) in the laminated porous film of the present invention will be described in detail.

<Substrate Material Porous Film (A Layer)>

The A layer has a structure having continuous fine pores therein and is configured such that vapor or liquid can permeate the layer from one surface to the other surface.

Since the A layer has the property of melting at high temperatures to be nonporous, a shutdown function is imparted to the laminated porous film by melting the A layer to be nonporous at the time of abnormal heat generation when the A layer is used as the separator.

The substrate material porous film is a porous film predominantly composed of polyolefin (porous polyolefin film). The percentage of the polyolefin component is essentially 50% by volume or more of the whole A layer, preferably 90% by volume or more, and more preferably 95% by volume or more.

Further, the polyolefin component of the porous polyolefin film preferably contains a high molecular weight component having a weight average molecular weight of $5 \times 10^5$ to $150 \times 10^5$. In the case where the A layer is a porous polyolefin film, if the A layer contains a polyolefin component having a weight average molecular weight of 1000000 or more as a polyolefin component, it is preferred since the strength of the A layer, and accordingly the strength of the whole laminated porous film including the A layer, is enhanced.

Examples of the polyolefin include high molecular weight homopolymers and copolymers obtained by polymerizing ethylene, propylene, 1-butene, 4-methyl-1-pentene, 1-hexene, etc. Among these, a high molecular weight polyethylene, which is predominantly composed of ethylene and has a weight average molecular weight of 1000000 or more, is preferred.

The pore size of the A layer is preferably 3 μm or less, and more preferably 1 μm or less from the viewpoint of the ion permeability and the prevention of particle penetration into positive electrode or negative electrode when the A layer is used as a separator of a battery.

The A layer has an air permeability (as Gurley value) of usually 30 to 1000 seconds/100 cc, and preferably 50 to 500 seconds/100 cc.

When the A layer has the air permeability in the above range, sufficient ion permeability can be attained when the A layer is used as a separator.

The thickness of the A layer is appropriately determined in consideration of the thickness of the heat-resistant layer of the laminated porous film, and it is preferably 4 to 40 μm, and more preferably 7 to 30 μm.

The A layer has a porosity of preferably 20 to 80% by volume, and more preferably 30 to 70% by volume. When the porosity is within such a range, the A layer has excellent ion permeability and exhibits excellent characteristics when used as a separator for a non-aqueous electrolyte secondary battery. When the porosity is less than 20% by volume, the amount of the electrolyte to be retained may be small, and when the porosity is more than 80% by volume, it may be insufficient to make the A layer nonporous at temperatures at which shutdown occurs, that is, there is a possibility that an electric current cannot be blocked at abnormal heat generation.

The A layer has a weight per unit area of usually 4 to 15 $g/m^2$, and preferably 5 to 12 $g/m^2$ in that the strength, thickness, handleability and weight of the laminated porous film can be improved and further in that the weight energy density or volume energy density of a battery can be increased when the A layer is used as a separator of the battery.

A production method for the A layer is not particularly limited, and examples thereof include a method in which a plasticizer is added to a thermoplastic resin and the resulting resin is formed into a film, and then the plasticizer is removed by using an appropriate solvent, as shown in JP-A-H07-29563, and a method in which using a film made of a thermoplastic resin produced by a known method, a structurally weak amorphous portion of a film composed of a thermoplastic resin is selectively stretched to form a fine pore, as shown in JP-A-H07-304110. For example, when the A layer is formed from ultra-high molecular weight polyethylene and a polyolefin resin containing a low-molecular weight polyolefin having a weight average molecular weight of 10000 or less, a method of performing the following steps (1) to (4) is suitable from the viewpoint of production cost.

That is, (1) a step of kneading 100 parts by weight of ultra-high molecular weight polyethylene, 5 to 200 parts by weight of a low-molecular weight polyolefin having a weight average molecular weight of 10000 or less and 100 to 400 parts by weight of an inorganic filler such as calcium carbonate to prepare a polyolefin resin composition;

(2) a step of forming the polyolefin resin composition into a sheet;

(3) a step of removing the inorganic filler from the sheet formed in the step (2); and (4) a step of stretching the sheet formed in the step (3) to obtain an A layer.

For the A layer, a commercialized product having the above-mentioned characteristics can be used.

<Heat-Resistant Layer (B Layer)>

The B layer is formed by applying the coating liquid of the present invention onto one side or both sides of the A layer, and then removing the solvent. In the B layer to be formed, since the inorganic fillers contained in the coating liquid of the present invention are more firmly bound to one another and the shape of the B layer does not change at a temperature at which the A layer becomes nonporous, the function of shape retainability is imparted to the laminated porous film.

A method of applying the coating liquid onto the substrate material porous film is not particularly limited as long as it is a method capable of performing wet-coating uniformly, and a conventionally known method can be employed. For example, a capillary coating method, a spin coating method, a slit die coating method, a spray coating method, a dip coating method, a roll coating method, a screen printing method, a flexographic printing method, a bar coater method, a gravure coater method, and a die coater method can be employed. The thickness of the B layer to be formed can be controlled by adjusting the amount to be applied and the concentration of solid content in the coating liquid.

Although the coating liquid can be directly applied onto the substrate material porous film, it is preferred the substrate material porous film is previously subjected to a hydrophilization treatment. By subjecting the substrate material porous film to the hydrophilization treatment, the coatability of the substrate material porous film is improved, and a more homogenous B layer can be achieved. The hydrophilization treatment is effective particularly when the concentration of water in the solvent is high.

Specific examples of the hydrophilization treatment method of the substrate material porous film include a chemical treatment of the substrate material porous film by acid or alkali, a corona discharge treatment, and a plasma treatment.

In a corona discharge treatment, there are advantages that the substrate material porous film can be hydrophilized in a relatively short time, and the modification of the polyolefin resin by corona discharge is limited to an area in the vicinity of the surface of a membrane, and therefore high coatability can be ensured without changing the property of the interior of the substrate material porous film.

Examples of the method of removing the solvent from the coating liquid applied onto the substrate material porous film include a method of drying under heating, and a method of immersing the substrate material porous film in a different solvent to replace the solvent with the different solvent;

however, a method of drying under heating is preferred not only for removing the solvent by heating but also for promoting the crosslinking of PVA with boric acid and/or the organometallic compound having the ability of cross-linking PVA.

When the coating liquid is applied onto the surface of the substrate material porous film, the drying temperature of the solvent needs to be a temperature at which the air permeability of the substrate material porous film is not deteriorated, that is, a temperature equal to or lower than the temperature at which shutdown occurs, and the drying temperature is preferably 40° C. or higher in order to allow a crosslinking reaction to proceed sufficiently. It is preferred that heating at 40° C. or higher is continued for several seconds to several minutes after removing the solvent in order to accelerate the crosslinking reaction. With respect to the heating step after removing the solvent, it is convenient and preferred that a drying furnace is lengthened and the heating step is performed sequentially to the step of removing the solvent.

The thickness of the B layer is usually 0.1 μm or more and 10 μm or less, and preferably 2 μm or more and 6 μm or less. When the thickness of the B layer is too large, there is a possibility that the load characteristics of a non-aqueous electrolyte secondary battery may be deteriorated in the case of producing the battery, and on the other hand, when the thickness is too small, there is a possibility that the separator may shrink without standing the thermal shrinkage of the polyolefin porous membrane in the occurrence of the abnormal heat generation of the battery.

When the B layer is formed on both sides of the A layer, the thickness of the B layer refers to a total thickness of both sides.

The B layer is formed as a porous membrane, and the pore diameter thereof is preferably 3 μm or less, and more preferably 1 μm or less in terms of the diameter of a sphere which is closely analogous to the pore. When the average pore diameter is more than 3 μm, there is a possibility to cause a problem such that a short circuit tends to occur when a carbon powder which is a main component of positive electrode or negative electrode or small pieces thereof are exfoliated.

The B layer has a porosity of preferably 30 to 90% by volume, and more preferably 40 to 85% by volume.

<Laminated Porous Film>

The laminated porous film of the present invention is obtained by applying the above-mentioned coating liquid of the present invention onto one side or both sides of the substrate material porous film, and then removing the solvent. Further, in the case of laminating the B layer on both side of the substrate material porous film, a sequentially laminating method in which the B layer is formed on one side and then laminating the B layer on the other side, or a simultaneously laminating method in which the B layer is formed simultaneously on both sides of the substrate material porous film is employed.

By using the coating liquid of the present invention, it is possible to provide a laminated porous film including a heat-resistant layer (B layer) having suppressed powder fall-off and excellent heat shape stability as well as excellent ion permeability, and the laminated porous film is suitable for a separator for a non-aqueous electrolyte secondary battery.

The thickness of the whole laminated porous film (A layer+B layer) of the present invention is usually 5 to 80 μm, preferably 5 to 50 μm, and particularly preferably 6 to 35 μm. When the thickness of the whole laminated porous film is less than 5 μm, the film is apt to break. When the thickness is too large, the electric capacitance of a battery tends to decrease when the laminated porous film is used as a separator for a non-aqueous secondary battery.

The whole laminated porous film of the present invention has a porosity of usually 30 to 85% by volume, and preferably 35 to 80% by volume.

The laminated porous film of the present invention has an air permeability (as Gurley value) of preferably 50 to 2000 seconds/100 cc, and more preferably 50 to 1000 seconds/100 cc.

A battery having a smaller value of air permeability in such a range can exert high load characteristics since the laminated porous film of the present invention exhibits more sufficient ion permeability and cycle characteristics when a non-aqueous electrolyte secondary battery is produced by using the laminated porous film of the present invention as a separator.

A smaller value of the shape retention ratio upon heating in a machine direction or a transverse direction of the laminated porous film at high temperatures at which shutdown occurs is preferably 95% or more, and more preferably 97% or more. The machine direction as used herein is a longitudinal direction in forming a sheet and the transverse direction as used herein is a width direction in forming a sheet. High temperatures at which shutdown occurs are temperatures of 80 to 180° C., and usually temperatures of about 130 to 150° C.

The laminated porous film of the present invention may contain a porous membrane such as an adhesion film or a protective film other than the substrate material porous film (A layer) and the heat-resistant layer (B layer) within a range which does not impair the object of the present invention.

The laminated porous film of the present invention is characterized in that the amount of powder fall-off is small. The phrase "the amount of powder fall-off is small" as used herein means that the amount of the heat-resistant layer, which is peeled off (hereinafter, may be referred to as a "amount of rubbing powder fall-off") in rubbing against something (hereinafter, may be referred to as a "rubbing powder fall-off test"), is small.

The rubbing powder fall-off test is a test in which the filler is exfoliated from the surface of the B layer by rubbing a surface layer of the B layer with an object, and is a method of evaluating mainly an adhesive force between fillers in the surface layer or the interior of the B layer. In the laminated porous film of the present invention, it is important that the amount of rubbing powder fall-off is small since there are many steps in which the film runs on a roller in using the film as a separator for a non-aqueous electrolyte secondary battery.

<Non-Aqueous Electrolyte Secondary Battery>

The non-aqueous electrolyte secondary battery of the present invention uses the modified laminated-porous film of the present invention as a separator.

Hereinafter, a lithium secondary battery will be described as a suitable example of the non-aqueous electrolyte secondary battery of the present invention; however, the present invention is not limited to this example.

A non-aqueous electrolyte secondary battery usually includes an electrode group formed by laminating a negative electrode sheet, a separator and a positive electrode sheet, and a non-aqueous electrolyte; however, the non-aqueous electrolyte secondary battery of the present invention uses the laminated porous film of the present invention as a separator.

A non-aqueous electrolyte secondary battery, which is produced by using the laminated porous film of the present invention as a separator, becomes a non-aqueous electrolyte secondary battery having high load characteristics and high safety since the separator exerts a shutdown function to avoid the contact between positive electrode and negative electrode due to shrinkage of the separator even when the battery causes abnormal heat generation.

The shape of the non-aqueous electrolyte secondary battery of the present invention is not particularly limited, and may be any of a paper shape, a coin shape, a cylindrical shape, and a prismatic shape and a laminate shape.

As the positive electrode sheet, a sheet in which a mixture containing a positive electrode active material, a conductive material and a binding material is supported on a current collector can be generally used. Specifically, a sheet containing a material capable of being doped or dedoped with lithium ions as the positive electrode active material, a carbonaceous material as the conductive material, and a thermoplastic resin as the binding material can be used. Examples of the material capable of being doped or dedoped with a lithium ion include lithium composite oxides containing at least one of transition metals such as V, Mn, Fe, Co, and Ni. Among these, preferred are lithium composite oxides having an $\alpha$-NaFeO$_2$ structure such as lithium nickel oxide and lithium cobalt oxide; and lithium composite oxides having a spinel structure such as lithium manganese spinel in point of high average discharge voltage.

The lithium composite oxide may contain a variety of metal elements, and particularly when a composite lithium nickel oxide, which contains at least one metal element selected from the group consisting of Ti, V, Cr, Mn, Fe, Co, Cu, Ag, Mg, Al, Ga, In and Sn in an amount of 0.1 to 20% by mole with respect to the sum of the number of moles of the metal element and the number of moles of nickel in lithium nickel oxide, is employed, it is preferred since cycle characteristics in the case of use at a high capacity are improved.

Examples of the binding material include thermoplastic resins such as polyvinylidene fluoride, a copolymer of vinylidene fluoride, polytetrafluoroethylene, tetra fluoroethylene-hexafluoropropylene copolymer, tetrafluoroethylene-perfluoroalkylvinylether copolymer, ethylene-tetrafluoroethylene copolymer, vinylidene fluoride-hexafluoropropylene-tetrafluoroethylene copolymer, thermoplastic polyimide, polyethylene, and polypropylene.

Examples of the conductive material include carbonaceous materials such as natural graphite, artificial graphite, cokes, and carbon black. These materials may be used singly, or may be used, for example, as a mixture of artificial graphite and carbon black.

As the negative electrode sheet, a sheet in which a mixture containing a material capable of being doped or dedoped with lithium ions and a binding material, and lithium metal or lithium alloy are supported on a current collector can be generally used. Examples of the material capable of being doped or dedoped with lithium ions include carbonaceous materials such as natural graphite, artificial graphite, cokes, carbon black, thermally decomposed carbons, carbon fibers, and baked materials of organic polymer compounds; oxides doped or dedoped with lithium ions at a potential lower than positive electrode; and chalcogen compounds such as sulfides. With respect to the carbonaceous material, carbonaceous materials predominantly composed of graphite materials such as natural graphite and artificial graphite are preferred in that since potential flatness is high and an average discharge potential is low, a high energy density can be obtained in combination with positive electrode.

As the non-aqueous electrolyte, for example, a non-aqueous electrolyte obtained by dissolving a lithium salt in an organic solvent can be used. Examples of the lithium salt include one kind among LiClO$_4$, LiPF$_6$, LiAsF$_6$, LiSbF$_6$, LiBF$_4$, LiCF$_3$SO$_3$, LiN(SO$_2$CF$_3$)$_2$, LiC(SO$_2$CF$_3$)$_3$, Li$_2$B$_{10}$Cl$_{10}$, lower aliphatic lithium carbonate and LiAlCl$_4$, and mixtures of two or more kinds thereof. Among these, lithium salts containing at least one selected from the group consisting of LiPF$_6$, LiAsF$_6$, LiSbF$_6$, LiBF$_4$, LiCF$_3$SO$_3$, LiN(CF$_3$SO$_2$)$_2$, and LiC(CF$_3$SO$_2$)$_3$, respectively containing fluorine, are preferably used as the lithium salt.

More specifically, it is possible to use, for example, carbonates such as propylene carbonate, ethylene carbonate, dimethyl carbonate, diethyl carbonate, ethylmethyl carbonate, 4-trifluoromethyl-1,3-dioxoran-2-one and 1,2-di(methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N, N-dimethylacetoamide; carbamates such as 3-methyl-2-oxazolidone; sulfur-containing compounds such as sulfolane, dimethyl sulfoxide and 1,3-propanesultone; or the above-mentioned organic solvents having a fluorine substituent introduced therein, and a mixture of two or more thereof is usually used.

Among these, a solvent containing carbonates is preferred, and a mixture of a cyclic carbonate and a non-cyclic carbonate, or a mixture of a cyclic carbonate and ethers is more preferred. As the mixture of a cyclic carbonate and a non-cyclic carbonate, mixtures containing ethylene carbonate, dimethyl carbonate and ethylmethyl carbonate are preferred in that the mixtures have a wide operation temperature range and are hardly de composed even when a graphite material such as natural graphite or artificial graphite is used as a negative electrode active material.

EXAMPLES

Hereinafter, the present invention will be described in more detail by way of examples; however, the present invention is not limited to these examples.

(1) Thickness Measurement (Unit: μm)

The thickness of a film was measured by a high precision digital length measuring machine manufactured by Mitutoyo Corporation, and the average value of measurements at 5 points was taken as a thickness of a film.

(2) Weight Per Unit Area: (Unit: g/m$^2$)

A film was cut out into a piece 10-cm square, and the weight W (g) of the piece was measured. The weight per unit area was calculated by the following equation: weight per unit area (g/m$^2$)=W/(0.1×0.1). The weight per unit area of a heat-resistant layer (B layer) was determined by subtracting the weight per unit area of a substrate material porous film (A layer) from the weight per unit area of a laminated porous film.

(3) Porosity:

A film was cut out into a piece 10-cm square, and the weight W (g) and thickness D (cm) of the piece were measured. The weight of a material in the sample was calculated, the weight of each material: Wi (g) was divided by a true specific gravity to determine the volume of each material, and the porosity (% by volume) was calculated from the following equation. The weight per unit area of each material was calculated from the amount and ratio of a material used for formation of the film.

Porosity(% by volume)=100−[{($W1$/true specific gravity 1)+($W2$/true specific gravity 2)+ . . . +($Wn$/true specific gravity $n$)}/ (100×$D$)]×100

(4) Air permeability: The air permeability was measured with a digital timer type GURLEY TYPE DENSOMETER manufactured by Toyo Seiki Seisaku-sho, Ltd. in accordance with JIS P 8117.

(5) Shape Retention Ratio Upon Heating:

A film was cut out into a piece 8-cm square, a marking line of 6-cm square was drawn in the 8-cm square, and the film piece was sandwiched between two sheets of paper and placed in an oven at 150° C. After a lapse of 1 hour, the film piece was taken out from the oven and the dimension of the drawn square was measured to calculate the shape retention ratio upon heating. A calculation method of the shape retention ratio upon heating is as follows.

Length of marking line in machine direction (MD) before heating: L1
Length of marking line in transverse direction (TD) before heating: L2
Length of marking line in machine direction (MD) after heating: L3
Length of marking line in transverse direction (TD) after heating: L4

Shape retention ratio in MD(%)=($L3$/$L1$)×100

Shape retention ratio in TD(%))=($L4$/$L2$)×100

(6) Rubbing Powder Fall-Off Test

The amount of rubbing powder fall-off was measured by a surface rubbing test using a rubbing movement tester. One Savina Minimax (manufactured by KB SEIREN, LTD.) was attached to the rubbing part (2 cm×2 cm) of the rubbing movement tester, Savina Minimax was brought into contact with the heat-resistant layer side of the laminated porous film with a weight of 2 kg applied, and rubbed to and fro five times at a speed of 45 rpm, and the amount of rubbing powder fall-off was determined from a change in weight of the film area rubbed.

<Substrate Material Porous Film (A Layer)>

Ultra-high molecular weight polyethylene powder (70% by weight) (340M, produced by Mitsui Chemicals, Inc.) and 30% by weight of polyethylene wax (FNP-0115, produced by NIPPON SEIRO CO., LTD.) having a weight average molecular weight of 1000, and 0.4% by weight of an antioxidant (Irg 1010, produced by Ciba Specialty Chemicals), 0.1% by weight of an antioxidant (P168, produced by Ciba Specialty Chemicals) and 1.3% by weight of sodium stearate with respect to 100 parts by weight of the ultra-high molecular weight polyethylene and the polyethylene wax were added, and to the resulting mixture, calcium carbonate (produced by MARUO CALCIUM CO., LTD.) having an average particle size of 0.1 μm was added so as to be 38% by volume with respect to the whole volume of the mixture. These materials were mixed as powder by a Henschel mixer, and then melt-kneaded by a twin-screw kneader to obtain a polyolefin resin composition. The polyolefin resin composition was rolled with a pair of roller whose surface temperature was 150° C. to prepare a sheet. The sheet was immersed in an aqueous hydrochloride solution (hydrochloric acid 4 mole/L, nonionic surfactant 0.5% by weight) to remove calcium carbonate, subsequently stretched by 6 times at 105° C. to obtain a substrate material porous film made of a polyethylene porous membrane.

Film thickness: 17.2 μm
Weight per unit area: 6.9 g/m$^2$
Air permeability: 80 seconds/100 cc Example 1

(1) Production of Coating Liquid

The coating liquid of Example 1 was prepared by the procedure described below.

First, to a water-isopropyl alcohol (IPA) mixed solvent (water:IPA=90:10 (by weight)), alumina (AKP-3000 produced by Sumitomo Chemical Co., Ltd.), polyvinyl alcohol (PVA) (produced by Wako Pure Chemical Industries, Ltd., Wako first class, average degree of polymerization 3100 to 3900, degree of saponification 86 to 90%), and carboxymethyl cellulose (CELLOGEN 3H produced by Daiichi Kogyo Seiyaku Co., Ltd.) were added so that the above material had a weight ratio of alumina:PVA:CMC=100:3:1, and the resulting mixture was stirred and mixed.

Then, a boric acid aqueous solution was added so that the amount of boric acid was 20 parts by weight with respect to 100 parts by weight of PVA, and the resulting mixture was stirred and mixed.

Furthermore, the mixed solution was passed through Gaulin Homogenizer (15MR-8TP, type) manufactured by APV with a pressure of 60 MPa applied to the homogenizer to disperse alumina. The operation of passing the solution with a pressure applied was carried out three times to prepare a coating liquid 1. In addition, the concentration of a solid content was adjusted to 23% by weight. The composition of the coating liquid 1 is shown in Table 1.

(2) Production and Evaluation of Laminated Porous Film

The coating liquid 1 was applied, by using a gravure coating machine, onto one side of the substrate material porous film (A layer) subjected to a corona discharge treatment at 50 W/(m$^2$/minute), and the coating liquid 1 was dried at 60° C. so that a B layer serving as a heat-resistant layer was formed on the A layer. Thus, a laminated porous film according to Example 1 was obtained. The properties of the laminated porous film of Example 1 obtained by the above-mentioned method are shown in Table 2. A difference between the maximum value and the minimum value of the film thickness of the B layer was as small as 0.5 μm, and the appearance thereof was good.

Example 2

(1) Production of Coating Liquid

A coating liquid 2 was obtained in the same operational procedure as in (1) Production of Coating Liquid of Example 1 except for adding the boric acid aqueous solution after the alumina dispersion treatment by Gaulin Homogenizer. The composition of the coating liquid 2 is shown in Table 1.

(2) Production and Evaluation of Laminated Porous Film

A laminated porous film was obtained in the same operational procedure as in (2) Production and Evaluation of Separator of Example 1 except for using the coating liquid 2 as a coating liquid. The properties of the laminated porous film of Example 2 obtained by the above-mentioned method are shown in Table 2. A difference between the maximum value and the minimum value of the film thickness of the B layer was as small as 0.4 μm, and the appearance thereof was good.

Example 3

(1) Production of Coating Liquid

A coating liquid 3 was obtained in the same operational procedure as in Example 1 except for using sodium polyacrylate (weight average molecular weight 250000) in place of CMC. The composition of the coating liquid 3 is shown in Table 1.

(2) Production and Evaluation of Laminated Porous Film

A laminated porous film was obtained in the same operational procedure as in (2) Production and Evaluation of Separator of Example 1 except for using the coating liquid 3 as a coating liquid. The properties of the laminated porous film of Example 3 obtained by the above-mentioned method are shown in Table 2. A difference between the maximum value and the minimum value of the film thickness of the B layer was as small as 0.4 μm, and a laminated porous film having good appearance was obtained.

Example 4

(1) Production of Coating Liquid

A coating liquid 4 was obtained in the same operational procedure as in Example 1 except for using an aqueous solution of an organic titanium compound (titanium lactate, trade name: ORGATIX TC-310, produced by Matsumoto Fine Chemical Co. Ltd.) in place of the boric acid aqueous solution. The composition of the coating liquid 4 is shown in Table 1.

(2) Production and Evaluation of Laminated Porous Film

A laminated porous film was obtained in the same operational procedure as in (2) Production and Evaluation of Separator of Example 1 except for using the coating liquid 4 as a coating liquid. The properties of the laminated porous film of Example 4 obtained by the above-mentioned method are shown in Table 2. A difference between the maximum value and the minimum value of the film thickness of the B layer was as small as 0.3 μm, and a laminated porous film having good appearance was obtained.

Comparative Example 1

(1) Production of Coating Liquid

A coating liquid 5 was obtained in the same operational procedure as in Example 1 except for not using the boric acid aqueous solution. The composition of the coating liquid 5 is shown in Table 1.

(2) Production and Evaluation of Laminated Porous Film

A laminated porous film was obtained in the same operational procedure as in (2) Production and Evaluation of Separator of Example 1 except for using the coating liquid 5 as a coating liquid. The properties of the laminated porous film of Comparative Example 1 obtained by the above-mentioned method are shown in Table 2. A difference between the maximum value and the minimum value of the film thickness of the B layer was as small as 0.1 μm, and a laminated porous film having good appearance was obtained.

Comparative Example 2

(1) Production of Coating Liquid

A coating liquid 6 was obtained in the same operational procedure as in Example 1 except for not adding CMC. The composition of the coating liquid 6 is shown in Table 1.

(2) Production and Evaluation of Laminated Porous Film

When the coating liquid 6 was applied, by using a gravure coating machine, onto one side of the substrate material porous film subjected to a corona discharge treatment at 50 W/(m²/minute), a coated surface became rough, a difference between the maximum value and the minimum value of the film thickness of the B layer was as large as 5.9 μm, and uneven coating was found in appearance, and therefore a good laminated porous film could not be attained.

Comparative Example 3

(1) Production of Coating Liquid

When the same operational procedure as in Example 2 was performed except for not adding CMC, alumina was precipitated in adding the boric acid aqueous solution; however, a relatively uniform coating liquid 7 was obtained by further stirring the mixture. The composition of the coating liquid 7 is shown in Table 1.

(2) Production and Evaluation of Laminated Porous Film

When the coating liquid 7 was applied, by using a gravure coating machine, onto one side of the substrate material porous film subjected to a corona discharge treatment at 50 W/(m²/minute), a coated surface became rough, a difference between the maximum value and the minimum value of the film thickness of the B layer was as large as 6.3 μm, and uneven coating was found in appearance, and therefore a good laminated porous film could not be attained.

Comparative Example 4

(1) Production of Coating Liquid

A coating liquid 8 was obtained in the same operational procedure as in Example 2 except for using alkyl ether (SANMORIN 11, produced by Sanyo Chemical Industries, Ltd.) in place of CMC. The composition of the coating liquid 8 is shown in Table 1.

(2) Production and Evaluation of Laminated Porous Film

When the coating liquid 8 was applied, by using a gravure coating machine, onto one side of the substrate material porous film subjected to a corona discharge treatment at 50 W/(m²/minute), a coated surface became rough, a difference between the maximum value and the minimum value of the film thickness of the B layer was as large as 5.3 μm, and uneven coating was found in appearance, and therefore a good laminated porous film could not be attained.

Comparative Example 5

(1) Production of Coating Liquid

A coating liquid 9 was obtained in the same operational procedure as in Example 1 except for not adding CMC and boric acid. The composition of the coating liquid 9 is shown in Table 1.

(2) Production and Evaluation of Laminated Porous Film

A laminated porous film was obtained in the same operational procedure as in (2) Production and Evaluation of Separator of Example 1 except for using the coating liquid 9 as a coating liquid. The properties of the laminated porous film of Comparative Example 5 obtained by the above-mentioned method are shown in Table 2.

TABLE 1

|  | Coating liquid | Inorganic filler | PVA cross-linking compound Kind | PVA cross-linking compound *Amount added (parts by weight) | Water-soluble compound Kind | Water-soluble compound **Amount added (parts by weight) |
|---|---|---|---|---|---|---|
| Example 1 | Coating liquid 1 | Alumina | Boric acid | 20 | CMC | 1 |
| Example 2 | Coating liquid 2 | Alumina | Boric acid | 20 | CMC | 1 |
| Example 3 | Coating liquid 3 | Alumina | Boric acid | 20 | PAANa | 1 |
| Example 4 | Coating liquid 4 | Alumina | Titanium lactate | 20 | CMC | 1 |
| Comparative Example 1 | Coating liquid 5 | Alumina | — | — | CMC | 1 |
| Comparative Example 2 | Coating liquid 6 | Alumina | Boric acid | 20 | None | — |
| Comparative Example 3 | Coating liquid 7 | Alumina | Boric acid | 20 | None | — |
| Comparative Example 4 | Coating liquid 8 | Alumina | Boric acid | 20 | Alkyl ether | 1 |
| Comparative Example 5 | Coating liquid 9 | Alumina | — | — | None | — |

CMC: carboxymethyl cellulose
PAANa: sodium polyacrylate
*part(s) by weight with respect to 100 parts by weight of PVA
**part(s) by weight with respect to 100 parts by weight of inorganic filler

TABLE 2

|  | Coating liquid | Film thickness [μm] A layer + B layer | Film thickness [μm] B layer | Weight per unit area [g/m²] A layer + B layer | Weight per unit area [g/m²] B layer | Porosity [% by volume] A layer + B layer | Air permeability (Gurley) [sec/100 cc] A layer + B layer | Shape retention ratio on 150° C. heating [%] MD | Shape retention ratio on 150° C. heating [%] TD | Amount of powder fall-off [g/m²] |
|---|---|---|---|---|---|---|---|---|---|---|
| Example 1 | Coating liquid 1 | 24.3 | 7.1 | 16.9 | 10.0 | 62 | 125 | 97.0 | 96.0 | 0 |
| Example 2 | Coating liquid 2 | 24.6 | 7.4 | 16.8 | 9.9 | 64 | 97 | 98.0 | 98.2 | 0 |
| Example 3 | Coating liquid 3 | 25.4 | 8.2 | 16.3 | 9.4 | 69 | 115 | 97.7 | 96.9 | 0 |
| Example 4 | Coating liquid 4 | 25.1 | 7.9 | 18.0 | 11.1 | 62 | 126 | 96.5 | 91.6 | 0 |
| Comparative Example 1 | Coating liquid 5 | 24.4 | 7.2 | 17.5 | 10.6 | 60 | 127 | 69.6 | 81.6 | 0.05 |
| Comparative Example 5 | Coating liquid 9 | 25.0 | 7.8 | 18.8 | 11.9 | 59 | 116 | 61.8 | 76.4 | 0 |

INDUSTRIAL APPLICABILITY

The present invention efficiently and stably provides a laminated porous film having suppressed powder fall-off and excellent heat shape stability, that is, a laminated porous film which is formed by laminating a heat-resistant layer containing PVA as a binder resin and an inorganic filler on a substrate material porous film. The laminated porous film is suitable for a separator for a non-aqueous electrolyte secondary battery, and therefore the present invention is industrially extremely useful.

The invention claimed is:

1. A coating liquid comprising polyvinyl alcohol (PVA), boric acid and/or an organometallic compound having the ability of cross-linking PVA, an inorganic filler, a water-soluble compound having a carboxyl group and/or a sulfonic group, and water,
wherein a total amount of polyvinyl alcohol and the water-soluble compound is 2 parts by weight or more and 4 parts by weight or less with respect to 100 parts by weight of the inorganic filter.

2. The coating liquid according to claim 1, wherein the water-soluble compound is a polymer compound.

3. The coating liquid according to claim 1, wherein the water-soluble compound is one or more compounds selected from the group consisting of carboxymethyl cellulose, polyacrylic acid and salts thereof.

4. The coating liquid according to claim 1, wherein the coating liquid comprises boric acid and/or an organometallic compound having the ability of cross-linking PVA in an amount of 10 parts by weight or more and 40 parts by weight or less with respect to 100 parts by weight of polyvinyl alcohol.

5. The coating liquid according to claim 1, wherein the inorganic filler is alumina.

6. The coating liquid according to claim 1, wherein the coating liquid comprises the water-soluble compound in an amount of 0.2 parts by weight or more and 2 parts by weight or less with respect to 100 parts by weight of the inorganic filler.

7. The coating liquid according to claim 1, wherein the organometallic compound having the ability of cross-linking PVA is an organic titanium compound having the ability of cross-linking PVA.

8. The coating liquid according to claim 7, wherein the organic titanium compound is titanium lactate.

9. A laminated porous film having a heat-resistant layer formed by applying the coating liquid according to claim 1 onto one side or both sides of a substrate material porous film and removing a medium.

10. A non-aqueous electrolyte secondary battery using the laminated porous film according to claim 9 used as a separator.

\* \* \* \* \*